United States Patent [19]
Yamamoto et al.

[11] Patent Number: 6,109,654
[45] Date of Patent: Aug. 29, 2000

[54] SHOCK ABSORPTING VEHICLE BODY STRUCTURE

[75] Inventors: Hidehiro Yamamoto; Minoru Kanda, both of Wako, Japan

[73] Assignee: Honda Giken Kogyo Kabushiki Kaisha, Tokyo, Japan

[21] Appl. No.: 09/209,782

[22] Filed: Dec. 11, 1998

[30] Foreign Application Priority Data

Dec. 12, 1997 [JP] Japan ................................. 9-342827

[51] Int. Cl.$^7$ ................................................. B62D 21/15
[52] U.S. Cl. ................................... 280/784; 280/124.109; 180/299
[58] Field of Search ........................... 280/784, 124.109; 180/299

[56] References Cited

U.S. PATENT DOCUMENTS

| | | | |
|---|---|---|---|
| 3,912,295 | 10/1975 | Eggert, Jr. ................................. | 280/106 |
| 4,133,549 | 1/1979 | Reindelbach et al. ................... | 280/784 |
| 4,148,505 | 4/1979 | Jensen et al. ............................. | 280/784 |
| 4,152,012 | 5/1979 | Reindelbach et al. ................... | 280/784 |
| 4,194,763 | 3/1980 | Reidelbach et al. ..................... | 280/784 |
| 4,406,343 | 9/1983 | Harasaki ................................. | 180/297 |
| 4,440,435 | 4/1984 | Norlin ..................................... | 296/188 |
| 5,429,388 | 7/1995 | Wheatley et al. ....................... | 280/784 |
| 5,454,453 | 10/1995 | Meyer et al. ............................ | 180/377 |
| 5,466,033 | 11/1995 | Murkami et al. ........................ | 296/189 |
| 5,564,745 | 10/1996 | Morin, Jr. ................................ | 280/784 |
| 5,584,510 | 12/1996 | Thuliez .................................... | 280/784 |
| 5,908,204 | 6/1999 | Smith ...................................... | 280/741 |
| 6,007,099 | 12/1999 | Barthelemy et al. .................... | 280/784 |

FOREIGN PATENT DOCUMENTS 52-11717  1/1977  Japan .

*Primary Examiner*—J. J. Swann
*Assistant Examiner*—J. Allen Shriver
*Attorney, Agent, or Firm*—Carrier, Blackman & Associates, P.C.; Joseph P. Carrier; William D. Blackman

[57] ABSTRACT

A shock absorbing vehicle body structure in a vehicle includes a substantially quadrilateral front subsidiary frame comprised of left and right side members extending in a longitudinal direction of a vehicle body and connected at their front and rear ends to each other by a front cross member and a rear cross member. The front subsidiary frame is supported at its four corners on main frames for the vehicle body through rubber mounts and bolts. Upon full-lap collision of the vehicle, the left rear bolt is first broken, whereby the rear end of the left side member is separated from the main frame and then, the right rear bolt is broken, whereby the rear end of the right side member is separated from the main frame. The right and left side members are formed with different rigidities to a longitudinal load applied thereto, which causes the right and left rear bolts to break at different times, or with a time lag therebetween. Such a time lag decreases the peak value of deceleration of the vehicle at a time when the front subsidiary frame is separated from the main frames due to a full-lap collision of the vehicle.

17 Claims, 8 Drawing Sheets

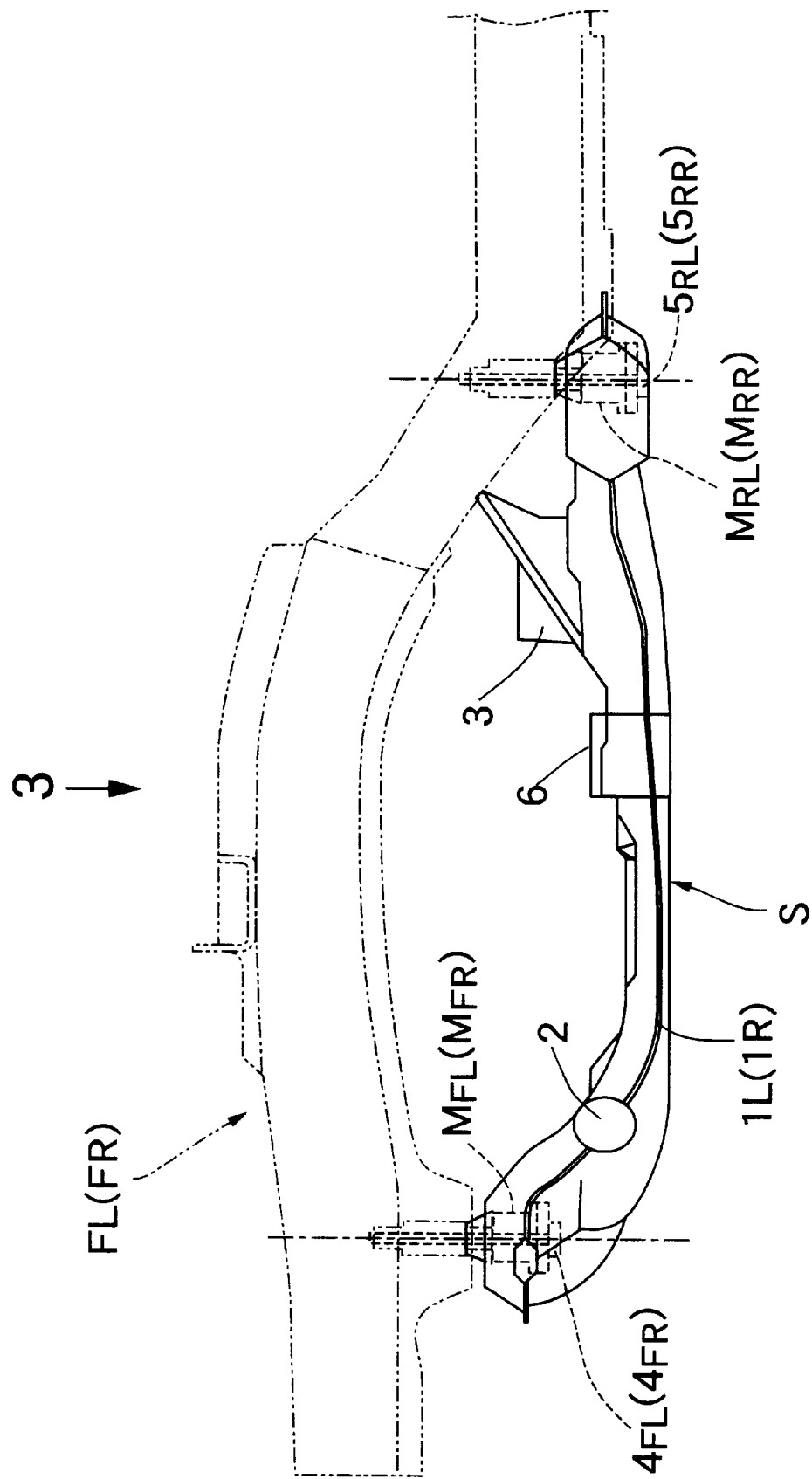

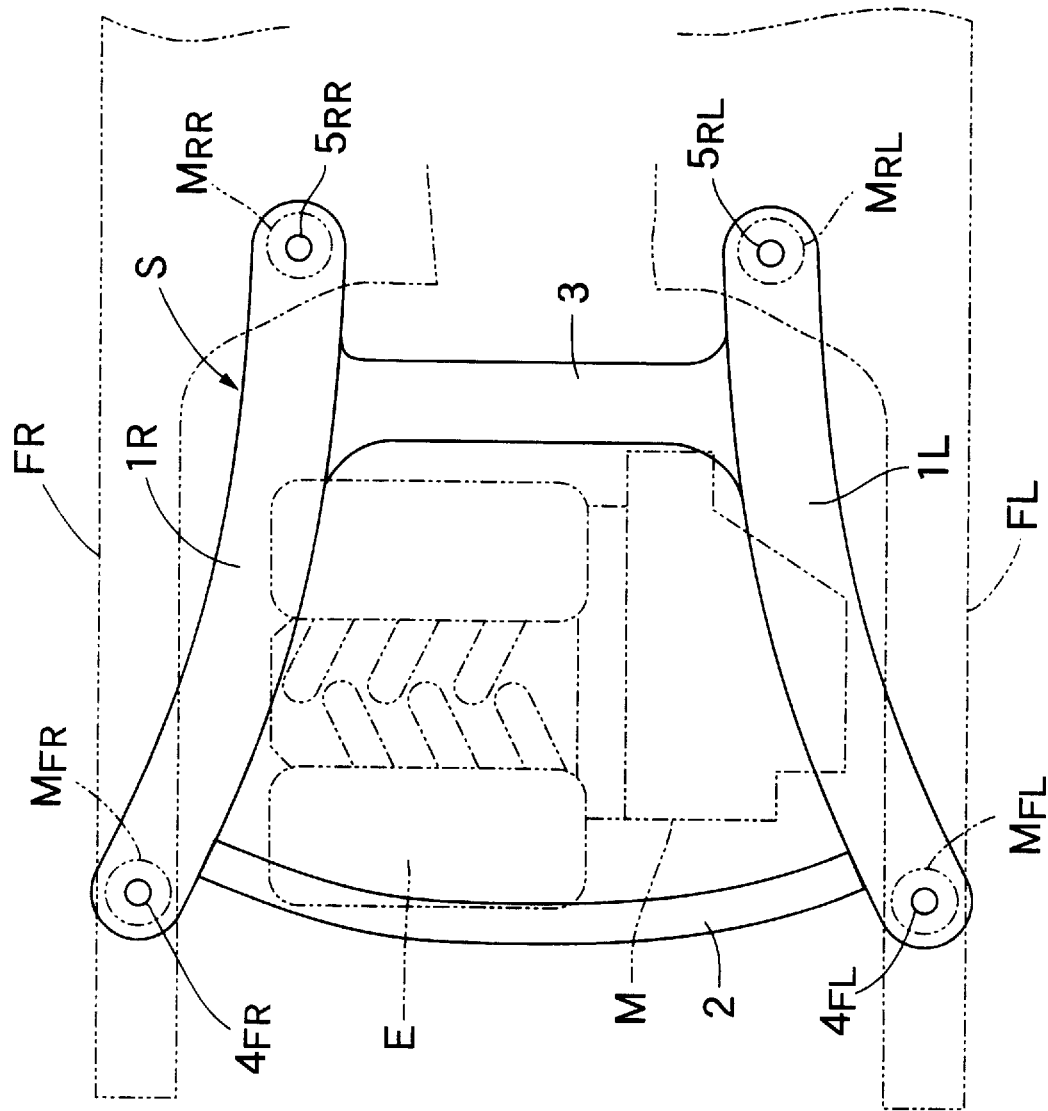

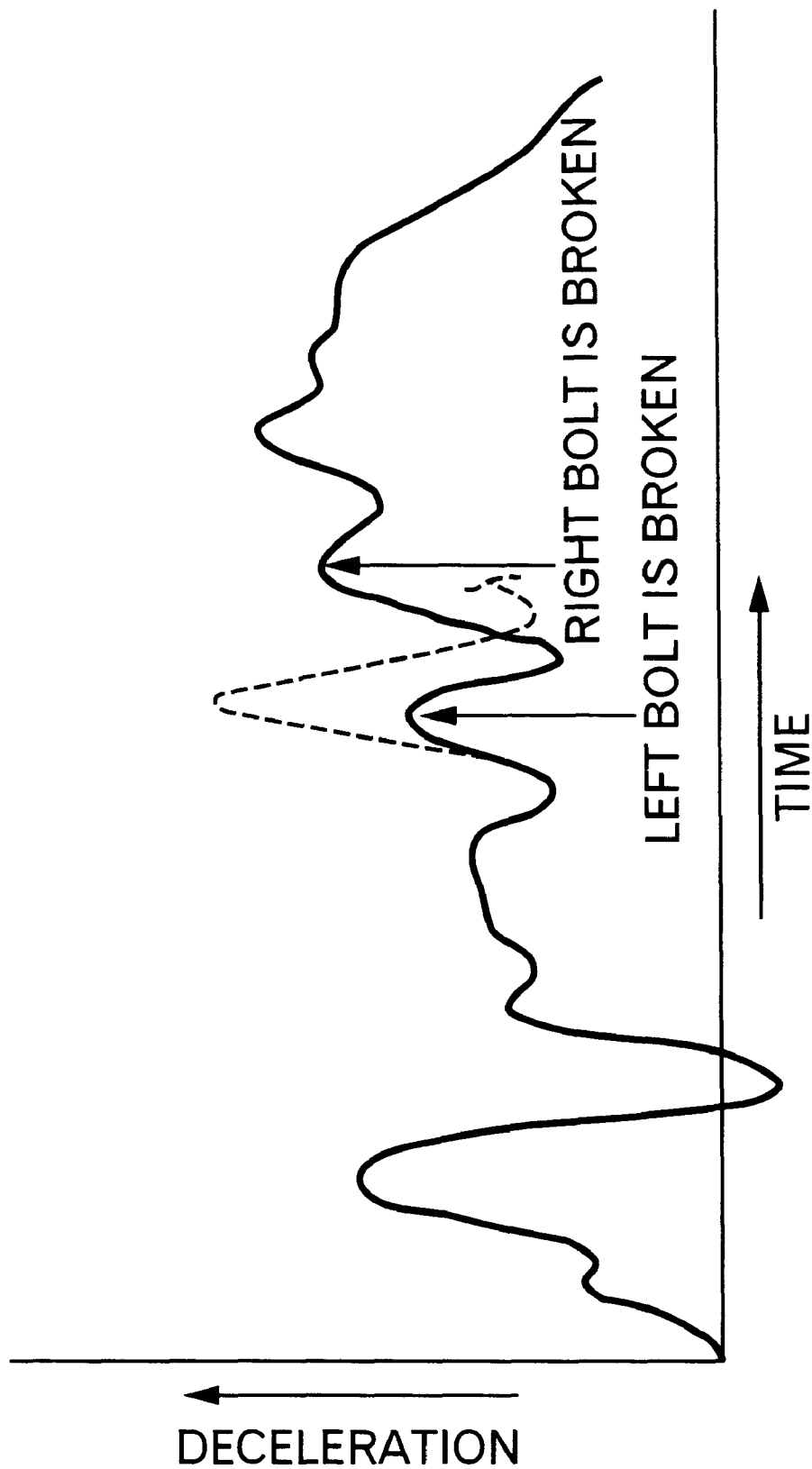

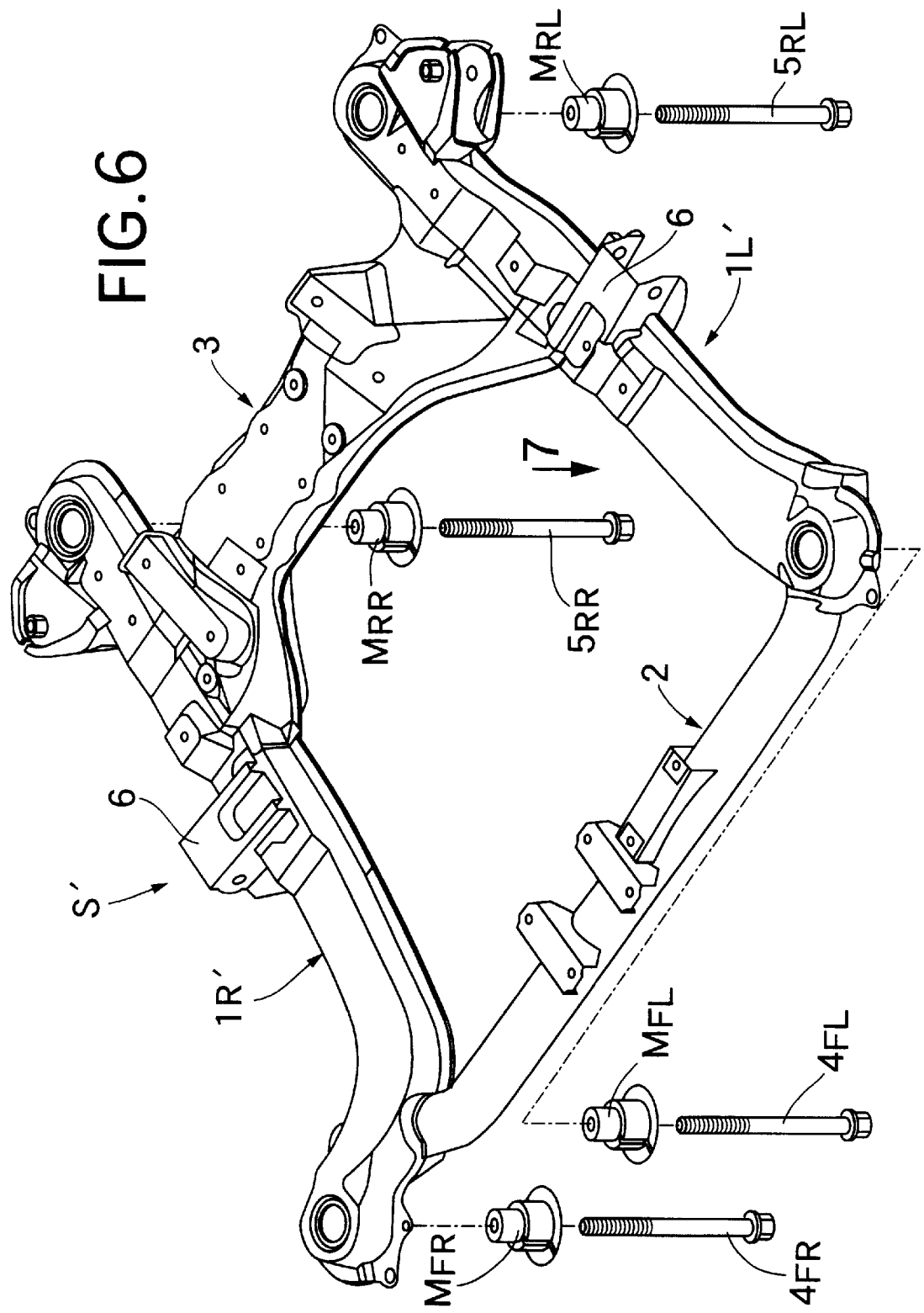

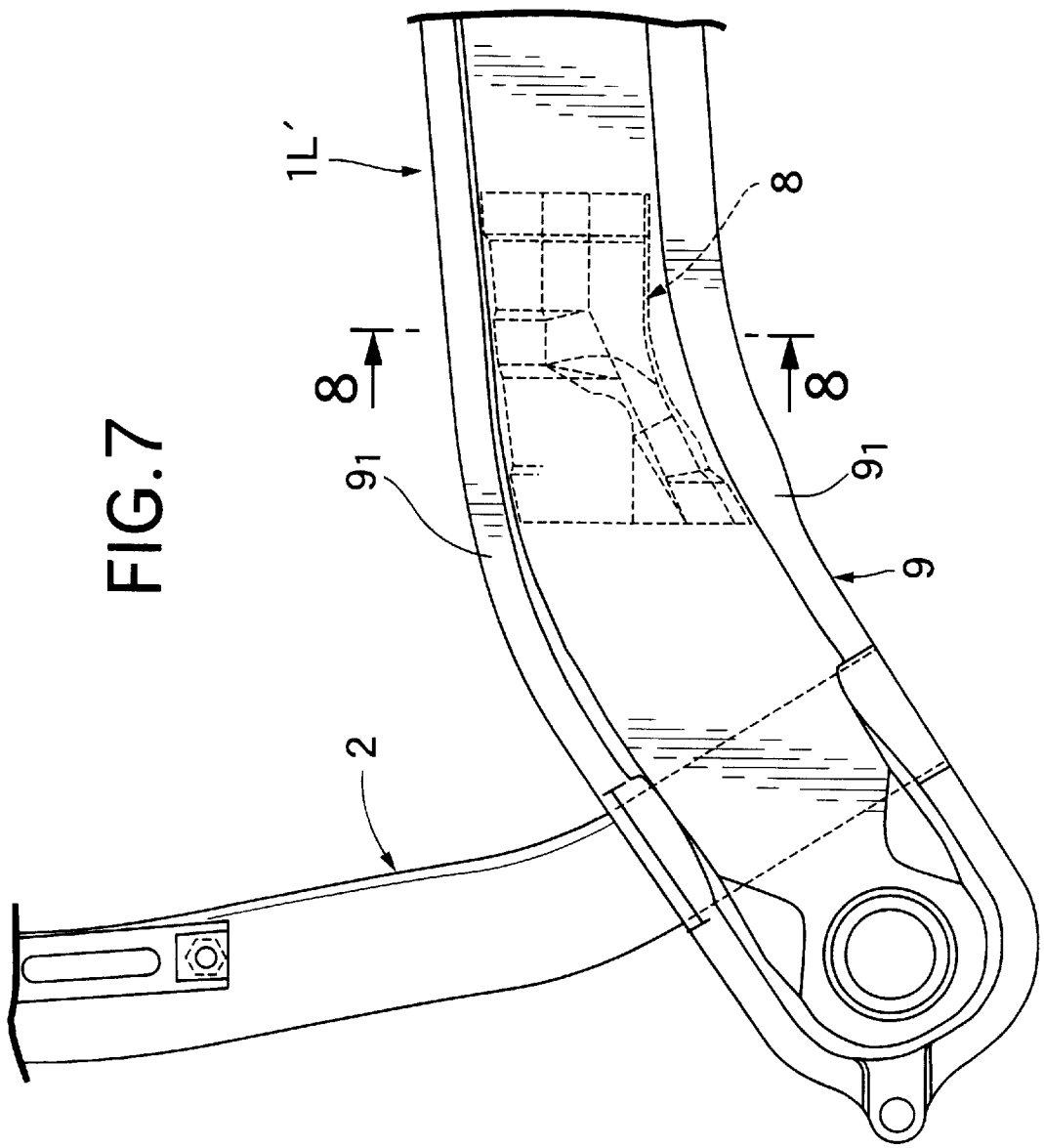

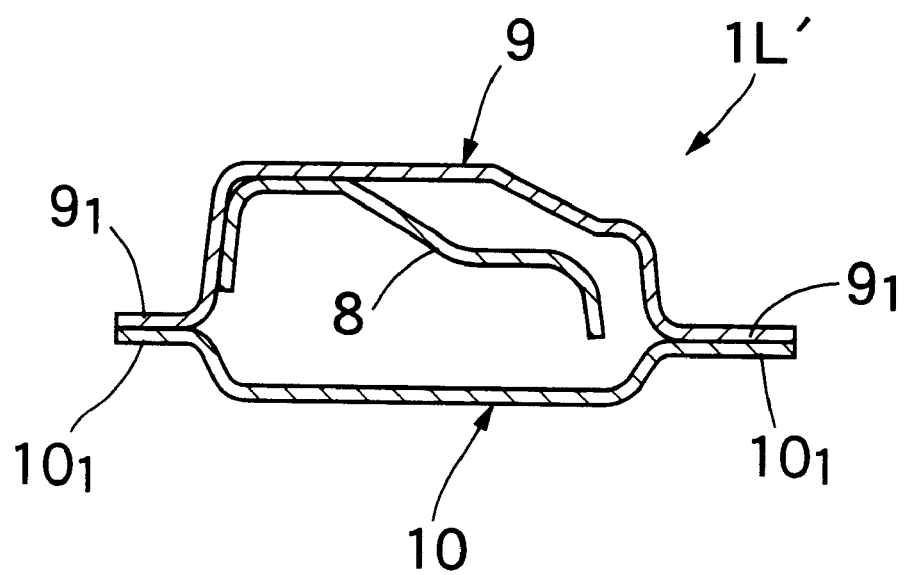

SHOCK ABSORBING VEHICLE BODY STRUCTURE

BACKGROUND OF THE INVENTION

1. Technical Field to Which the Invention Belongs

The present invention relates to a shock absorbing vehicle body structure in a vehicle including a front subsidiary frame supported on a main frame.

2. Discussion of Relevant Art

A shock absorbing vehicle body structure in a vehicle including a front subsidiary frame supported on a vehicle body is known from Japanese Utility Model Application Laid-open No. 52-11717. According to such known structure an arrangement is disclosed whereby, in order to prevent a vehicle compartment from being deformed by the front subsidiary frame upon frontal collision of the vehicle, bolts for coupling a rear end of the subsidiary frame to the vehicle body are broken and cut away from the vehicle body.

When the front subsidiary frame resists a compressing load inputted thereto from the front due to collision of the vehicle, the deceleration of the vehicle is increased. When the front subsidiary frame becomes separated from the vehicle body as a result of the collision, so that the front subsidiary frame cannot resist the compressing load, the deceleration is suddenly decreased. For this reason, a peak value of the deceleration is generated in a moment of the separation of the front subsidiary frame from the vehicle body. In this case, when the left and right rear ends of the front subsidiary frame are simultaneously separated from the vehicle body, the peak value of the deceleration is increased and for this reason, it is desirable that the peak value of the deceleration is suppressed to a lower value to moderate the shock associated therewith.

SUMMARY OF THE INVENTION

The present invention has been accomplished with the above circumstance in view, and it is an object of the present invention to decrease a peak value of the deceleration produced at the time when the front subsidiary frame is separated from the main frame due to a frontal collision of the vehicle.

To achieve the above object, according to a first aspect and feature of the present invention, there is provided a shock absorbing vehicle body structure comprising a substantially quadrilateral front subsidiary frame including of left and right side members extending in a longitudinal direction of a vehicle body and connected to each other at front and rear ends thereof by a front cross member and a rear cross member, main frames for the vehicle body, on which the front subsidiary frame is supported at four corners thereof, and time lag means for creating a time lag between separation of rear portions of the left and right side members, respectively, from the main frames as caused by a longitudinal load transmitted to the left and right side members upon full-lap collision of the vehicle.

With the above arrangement, the front subsidiary frame receiving the load due to the full-lap collision of the vehicle is retreated relative to the main frame, and a peak value of the deceleration is produced in a moment of separation of rear ends of the subsidiary frame from the main frames. However, in this operation, because the left and right rear ends of the front subsidiary frame are respectively separated from the main frames with the time lag therebetween, two dispersed peak values of the deceleration are provided. As a result, the peak values can be suppressed to lower values to reduce the shock associated therewith, and the deceleration can be continuously produced, as compared with a case where the left and right rear ends of the front subsidiary frame are separated simultaneously from the main frames to produce a single peak value.

According to a second aspect and feature of the present invention, in addition to the first aspect and feature, the time lag means includes the left and right side members which have different rigidities to the longitudinal load.

With the above arrangement, even if a load is applied uniformly to the left and right side members due to the full-lap collision of the vehicle, the load transmitted to the rear end of the side member having a higher rigidity is larger than the load transmitted to the rear end of the side member having a lower rigidity. Therefore, the rear end of the side member having the higher rigidity can be first separated from the main frame to provide the time lag.

According to a third aspect and feature of the present invention, in addition to the second aspect and feature, at least one of the left and right side members has a stepped structure which is different from a structure of the other side member for providing the different rigidities. For example, only one of the left and right side members may have a step formed therein such that the one side member will have a lower rigidity than the other side member without a step. Further, if both of the side members have stepped structures, the side members may be provided with different rigidities by differences in the number and/or shapes of the steps in the side members, respectively.

With the above feature, if the step(s) are provided in the side members, the rigidity is decreased and therefore, the difference in rigidity between the left and right side members can be easily achieved by providing the difference(s) in number and/or shape of the step(s).

According to a fourth aspect and feature of the present invention, in addition to the second aspect and feature, the difference in rigidity is provided by reinforcing one of the left and right side members with a reinforcing member.

With the above feature, if only one of the side members is reinforced with the reinforcing member, its rigidity is increased. Therefore, the difference in rigidity can be provided between the left and right side members by reinforcing the one side member with the reinforcing member.

BRIEF DESCRIPTION OF THE DRAWINGS

FIGS. 1 to 5 show a first preferred embodiment of a shock absorbing vehicle body structure according to the present invention, in which:

FIG. 1 is a perspective view of a front subsidiary frame of a vehicle;

FIG. 2 is a side elevational view of the front subsidiary frame (shown in solid lines) supported on a main frame (shown in broken lines);

FIG. 3 is a plan view taken in a direction of an arrow 3 in FIG. 2;

and FIG. 5 is a graph for explaining a shock absorbing effect of the invention.

FIGS. 6 to 8 show a second preferred embodiment of the present invention, in which:

FIG. 6 is a perspective view of a front subsidiary frame according to the second embodiment;

FIG. 7 is an enlarged view of an essential portion of the subsidiary frame looking in a direction of an arrow 7 in FIG. 6; and FIG. 8 is a sectional view taken along a line 8—8 in FIG. 7.

DETAILED DESCRIPTION OF THE PRESENTLY PREFERRED EMBODIMENTS

The preferred modes for carrying out the present invention will now be described by way of the preferred embodiments shown in the accompanying drawings.

Figure 1:
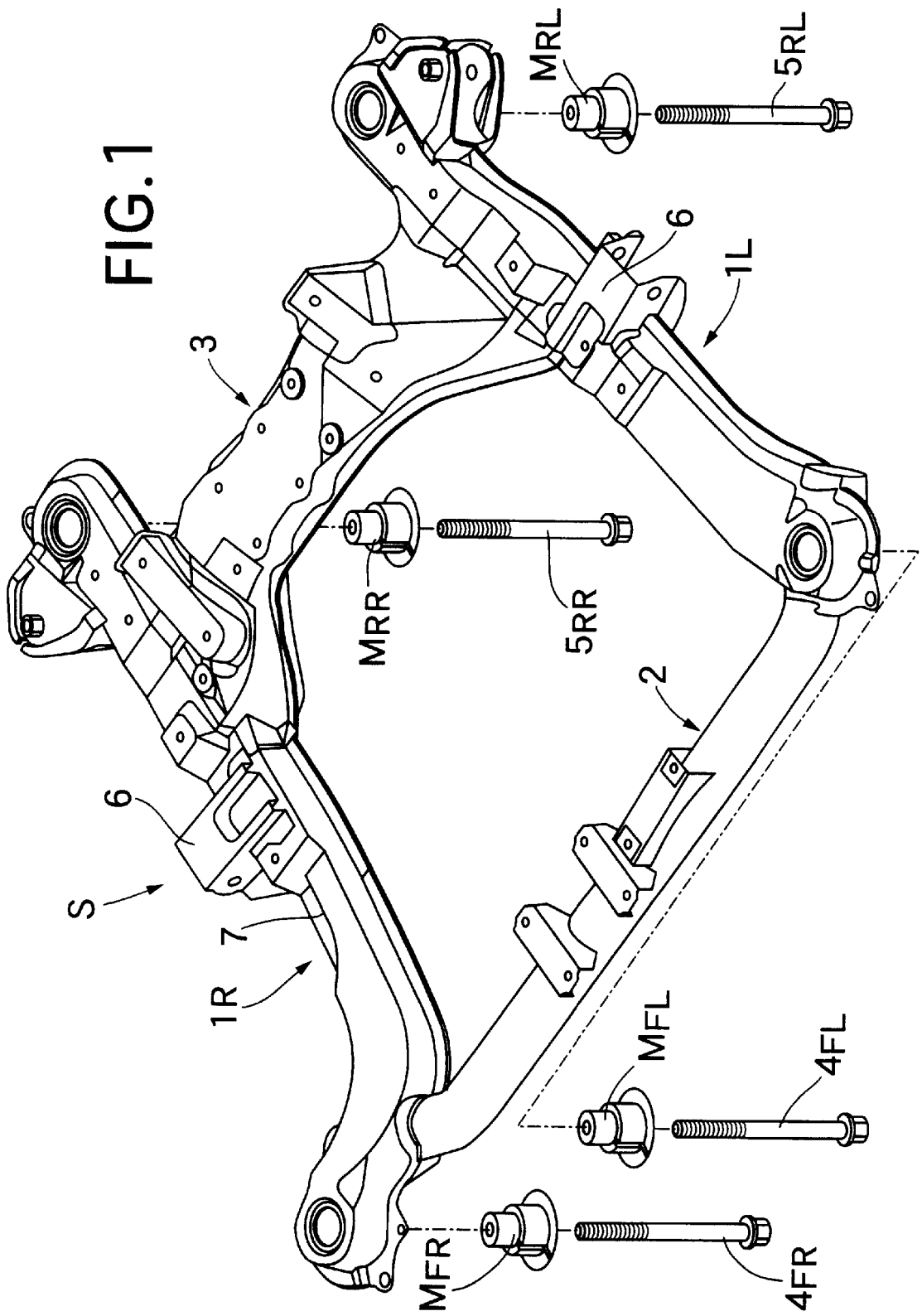

As shown in FIGS. 1 to 3, a front subsidiary frame S mounted at a front portion of a body of a vehicle includes a left side member 1L extending in a longitudinal direction of the vehicle body, a right side member 1R extending in the longitudinal direction of the vehicle body, a front cross member 2 extending in a lateral direction of the vehicle body and connecting front ends of the side members 1L and 1R, and a rear cross member 3 extending in the lateral direction of the vehicle body and connecting rear ends of the side members 1L and 1R. The front subsidiary frame S is formed into a substantially quadrilateral shape as viewed in a plane. Each of the side members 1L and 1R and the rear cross member 3 are preferably formed by integrally welding an upper member and a lower member made of a steel plate to each other, and the front cross member 2 is formed from a pipe material which is circular in section. An engine E (see FIG. 3) integrally provided with a transmission M and a front suspension (not shown) are supported on the front subsidiary frame S.

The front subsidiary frame S is resiliently coupled to lower surfaces of left and right main frames FL and FR extending in the longitudinal direction of the vehicle body by two bolts $4_{FL}$ and $4_{FR}$ passed through two front rubber mounts $M_{FL}$ and $M_{FR}$ fitted in left and right front portions of the front subsidiary frame S, and two bolts $5_{RL}$ and $5_{RR}$ passed through two rear rubber mounts $M_{RL}$ and $M_{RR}$ fitted in left and right rear portions of the front subsidiary frame S. The front subsidiary frame S is curved downwards when viewed from the side, and the main frames FL and FR superposed on an upper surface of the front subsidiary frame S are curved upwards (see FIG. 2).

As can be seen from FIG. 1, suspension supporting brackets 6 for supporting left and right front suspensions are provided at longitudinally intermediate portions of the left and right side members 1L and 1R of the front subsidiary frame S. As can be seen by comparison of those portions of the left and right side members 1L and 1R which are in front of the suspension supporting brackets 6, the right side member 1R includes a step 7, whereas the left side member 1L is of a flat shape with no step provided therein. As a result, the right side member 1R has a reduced rigidity to buckling due to the presence of the step 7 and hence, is liable to be more readily buckled by a load applied from the front than is the left side member 1L. On the other hand, the left side member 1L with no step provided therein is more difficult to buckle than the right side member 1R by the load applied from the front.

The operation of the first embodiment having the above-described arrangement will be described below.

Figure 4A:
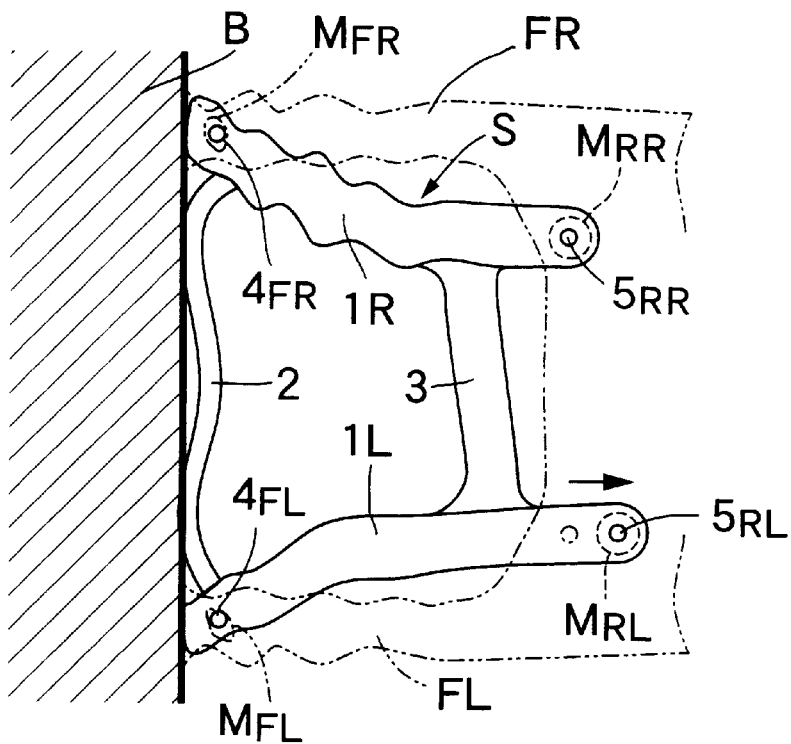
FIGS. 4A and 4B are views for explaining the operation upon full-lap collision of the vehicle with the subsidiary frame of the invention.

As shown in FIG. 4A, when the vehicle collides against an obstacle B substantially uniformly over its entire width, i.e., a so-called full-lap collision of the vehicle occurs, the left and right main frames FL and FR are uniformly buckled, and attendant on this, the left and right side members 1L and 1R of the front subsidiary frame S start to be buckled. In this case, the main frames FL and FR and the front subsidiary frame S are simultaneously deformed. Therefore, only a small shear force is applied to the two bolts $4_{FL}$ and $4_{FR}$ passed through the front rubber mounts $M_{FL}$ and $M_{FR}$, but the two bolts $5_{RL}$ and $5_{RR}$ passed through the rear rubber mounts $M_{RL}$ and $M_{RR}$ are broken under the action of a large shear force. For this reason, the rear portion of the front subsidiary frame S is separated from the main frames FL and FR.

Alternatively, the rear portion of the front subsidiary frame S can be separated from the main frames FL and FR by setting the strength of the two bolts $4_{FL}$ and $4_{FR}$ passed through the front rubber mounts $M_{FL}$ and $M_{FR}$ relative to the shear at a value higher than that of the two bolts $5_{RL}$ and $5_{RR}$ passed through the rear rubber mounts $M_{RL}$ and $M_{RR}$.

Figure 4B:
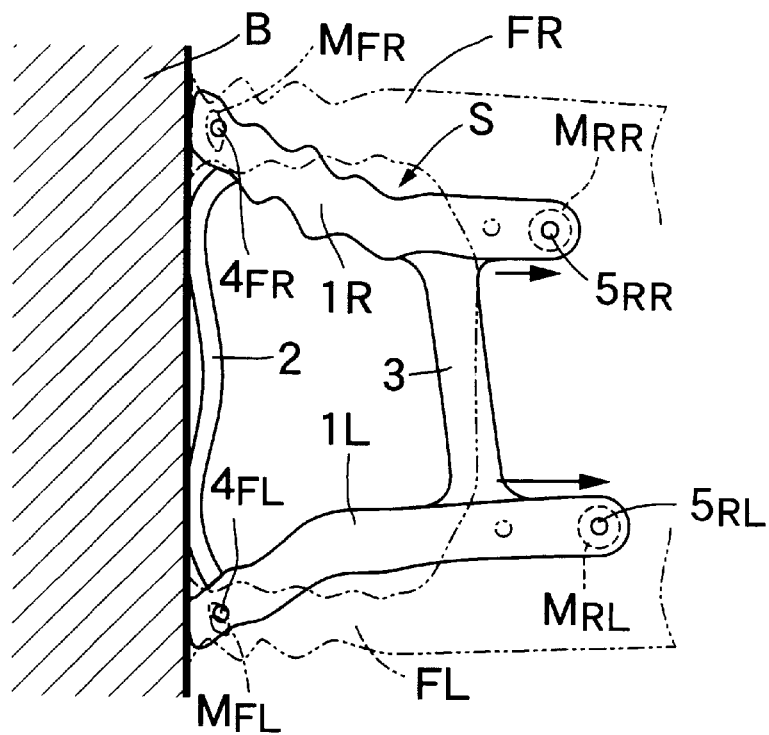

When a load is applied to the left and right side members 1L and 1R in the longitudinal direction of the vehicle body, the right side member 1R having the reduced rigidity due to the provision of the step 7 is relatively easily buckled, whereas the left side member 1L having no step 7 is more difficult to buckle. As a result, a large shear load is applied to the bolt $5_{RL}$ passed through the rear rubber mount $M_{RL}$ at the rear end of the left side member 1L, whereby the bolt $5_{RL}$ is first broken, and the bolt $5_{RR}$ passed through the rear rubber mount $M_{RR}$ at the rear end of the right side member 1R is later broken (see FIG. 4B). Thus, the rear portion of the front subsidiary frame S is separated from the main frame FL and FR, whereby the damage to a vehicle compartment due to the engine E and/or the transmission M supported on the front subsidiary frame S can be suppressed to the minimum.

The peak value of a deceleration upon collision of the vehicle is decreased by causing the left and right rear rubber mounts $M_{RL}$ and $M_{RR}$ to separate from the main frames FL and FR at different times, or with a time lag therebetween, as described above.

If it is supposed that the two bolts $5_{RL}$ and $5_{RR}$ passed through the left and right rear rubber mounts $M_{RL}$ and $M_{RR}$ have been broken simultaneously, the deceleration is suddenly increased due to a resisting force of the front subsidiary frame S immediately before the breaking, and the resisting force of the front subsidiary frame S disappears simultaneously with the breaking of the two bolts $5_{RL}$ and $5_{RR}$, whereby the deceleration is suddenly decreased, resulting in an extremely high peak value of the deceleration, as shown by a broken line in FIG. 5. On the other hand, when the two bolts $5_{RL}$ and $5_{RR}$ are broken separately with a time lag therebetween, two peaks are produced in correspondence to the breaking of the bolts $5_{RL}$ and $5_{RR}$, respectively, but the peak values are suppressed to be relatively low, as indicated by the two arrows in FIG. 5, whereby the shock is remarkably reduced as compared to the situation in which the bolts break simultaneously.

Moreover, to assure that the bolts break at different times in the event of a full-lap collision of the vehicle it is only required that the rigidities of the left and right side members 1L and 1R of the front subsidiary frame S are different from each other, without changing the strengths of the left and right rear rubber mounts $M_{RL}$ and $M_{RR}$. Therefore, there is no possibility that an influence is exerted on the vibration absorbing characteristics of the rear rubber mounts $M_{RL}$ and $M_{RR}$.

The second preferred embodiment of the invention is shown in FIGS. 6–8.

The front subsidiary frame S' according to the second embodiment is provided with a difference in rigidity by mounting a reinforcing member 8 within a left sided member 1L' without providing a difference in rigidity between left and right side members 1L' and 1R' themselves. More specifically, an upper member 9 and a lower member 10 are welded to each other at flanges $9_1$, $9_1$ and $10_1$, $10_1$ to form the left side member 1L' having a box-shaped section, and the reinforcing member 8 made by pressing a steel plate is welded to an inner surface of the upper member 9, thereby enhancing the rigidity of the left side member 1L'.

Even with the second embodiment, the two bolts $5_{RL}$ and $5_{RR}$ passed through the left and right rear rubber mounts $M_{RL}$ and $M_{RR}$ can be separately broken with a time lag therebetween under an influence of a difference in rigidity between the left side member 1L' having the reinforcing member 8 and the right side member 1R' having no reinforcing member, thereby suppressing the peak value of a deceleration generated due to full-lap collision of the vehicle to a lower value as compared to a structure in which the bolts $5_{RL}$, $5_{RR}$ break simultaneously.

The shock absorbing vehicle body structure according to the invention provides several advantages.

As discussed above, according to the first aspect and feature of the present invention, the front subsidiary frame receiving the load due to the full-lap collision of the vehicle is retreated relative to the main frames, and a peak value of the deceleration is produced in a moment of separation of rear ends of the subsidiary frame from the main frames. However, the left and right rear ends of the front subsidiary frame are separately separated from the main frames with the time lag therebetween, and hence, the two dispersed peak values of the deceleration are provided. As a result, the peak values are suppressed to lower values to reduce the shock, and the deceleration can be continuously produced, as compared with the case where the left and right rear ends of the front subsidiary frame are separated simultaneously from the main frames to produce a single peak value.

According to the second aspect and feature of the present invention, even if a load is applied uniformly to the left and right side members due to the full-lap collision of the vehicle, the load transmitted to the rear end of the side member having the higher rigidity is larger than the load transmitted to the rear end of the side member having the lower rigidity. Therefore, the rear end of the side member having the higher rigidity can be first separated from the main frame to provide the time lag.

According to the third aspect and feature of the present invention, if the steps are provided in one or both of the side members, the rigidity is decreased and therefore, the difference in rigidity between the left and right side members can be easily achieved by providing a difference in the number and/or shape of the step(s) provided in the left and right side members.

According to the fourth aspect and feature of the present invention, if one of the side members is reinforced with the reinforcing member, the rigidity is increased. Therefore, the difference in rigidity can be provided between the left and right side members by reinforcing the one side member with the reinforcing member.

Although the preferred embodiments of the present invention have been described in detail, it will be understood that the present invention is not limited to the above-described embodiments, and various modifications may be made without departing from the subject matter of the present invention.

For example, the rigidity of the left side member 1L, iL' is set higher than that of the right side member 1R, 1R' in the embodiments, but the rigidity of the right side member may alternatively be set higher than that of the left side member. In addition, a difference in strength may be provided between the left and right bolts $5_{RL}$ and $5_{RR}$ as a measure for separating the rear ends of the left and right side members 1L and 1R from the main frames FL and FR with a time lag therebetween. Further, steps 7 may be provided in both the left and right side members 1L and 1R in the first embodiment, but in this case, it is necessary to differentiate the number and shape between the left and right steps 7 to provide a difference in rigidity.

The scope of the invention is indicated by the appended claims.

We claim:

1. A shock absorbing vehicle body structure comprising:
 a substantially quadrilateral front subsidiary frame including left and right side members extending in a longitudinal direction of a vehicle body and connected to each other at front and rear ends thereof by a front cross member and a rear cross member;
 main frames of the vehicle body, on which said front subsidiary frame is supported at four corners thereof; and
 time lag means for creating a time lag between separation of rear portions of said left and right side members, respectively, from said main frames as caused by a longitudinal load transmitted to said left and right side members upon full-lap collision of the vehicle;
 said time lag means including said left and right side members which have different rigidities to the longitudinal load.

2. A shock absorbing vehicle body structure according to claim 1, wherein at least one of said left and right side members has a stepped structure which is different from a structure of the other side member for providing said different rigidities.

3. A shock absorbing vehicle body structure according to claim 2, wherein only one of said left and right side members has a step formed therein such that said one side member has a lower rigidity than said other side member.

4. A shock absorbing vehicle body structure according to claim 1, wherein one of said left and right side members includes a reinforcing member for providing said one side member with a greater rigidity than that of the other side member.

5. A shock absorbing vehicle body structure according to claim 4, wherein said reinforcing member is disposed within said one of said left and right side members.

6. A shock absorbing vehicle body structure according to claim 1, wherein said subsidiary frame supports an engine of the vehicle thereon.

7. A shock absorbing vehicle body structure according to claim 2, wherein said left and right side members support front suspensions of the vehicle thereon, respectively.

8. A shock absorbing vehicle body structure according to claim 7, wherein said stepped structure is disposed forwardly of a portion of at least one of the left and right side members supporting the front suspension thereon.

9. A shock absorbing vehicle body structure comprising:
 a substantially quadrilateral front subsidiary frame including left and right side members extending in a longitudinal direction of a vehicle body and connected to each other at front and rear ends thereof by a front cross member and a rear cross member;
 main frames of the vehicle body, on which said front subsidiary frame is supported at four corners thereof; and time lag means for creating a time lag between separation of rear portions of said left and right side members, respectively, from said main frames as caused by a longitudinal load transmitted to said left and right side members upon full-lap collision of the vehicle;

said time lag means including left and right bolts fixing left and right rear portions of said left and right side members to said main frames, said left and right bolts having different strengths.

10. A shock absorbing vehicle body structure comprising:

a substantially quadrilateral front subsidiary frame including left and right side members extending in a longitudinal direction of a vehicle body and connected to each other at front and rear ends thereof by a front cross member and a rear cross member; and main frames of the vehicle body, on which said front subsidiary frame is supported at four corners thereof;

said left and right side frames having different rigidities to a longitudinal load applied thereto for creating a time lag between separation of rear portions of said left and right side members, respectively, from said main frames as caused by a longitudinal load transmitted to said left and right side members upon full-lap collision of the vehicle.

11. A shock absorbing vehicle body structure according to claim 10, wherein at least one of said left and right side members has a stepped structure which is different from a structure of the other side member for providing said different rigidities.

12. A shock absorbing vehicle body structure according to claim 11, wherein only one of said left and right side members has a step formed therein such that said one side member has a lower rigidity than said other side member.

13. A shock absorbing vehicle body structure according to claim 10, wherein one of said left and right side members includes a reinforcing member for providing said one side member with a greater rigidity than that of the other side member.

14. A shock absorbing vehicle body structure according to claim 13, wherein said reinforcing member is disposed within said one of said left and right side members.

15. A shock absorbing vehicle body structure according to claim 10, wherein said subsidiary frame supports an engine of the vehicle thereon.

16. A shock absorbing vehicle body structure according to claim 10, wherein said left and right side members support front suspensions of the vehicle thereon, respectively.

17. A shock absorbing vehicle body structure according to claim 16, wherein said stepped structure is disposed forwardly of a portion of at least one of the left and right side members supporting the front suspension thereon.

* * * * *

UNITED STATES PATENT AND TRADEMARK OFFICE
CERTIFICATE OF CORRECTION

PATENT NO.   : 6,109,654
DATED        : August 29, 2000
INVENTOR(S)  : Hidehiro Yamamoto, Minoru Kanda It is certified that error appears in the above-identified patent and that said Letters Patent is hereby corrected as shown below:

On the title page, in the title ("[54]"), change "ABSORPTING" to -- ABSORBING--.

Column 1,
Line 1, change "ABSORPTING" to -- ABSORBING --.

Signed and Sealed this

Seventh Day of August, 2001

Attest:

*Attesting Officer*

NICHOLAS P. GODICI
*Acting Director of the United States Patent and Trademark Office*